Nov. 18, 1958

J. W. HARRISON 2,860,648

ANTI "G" LIQUID RESERVOIR

Filed Dec. 28, 1955

INVENTOR.
JOHN W. HARRISON
BY
Harold H. Green Jr
HIS ATTORNEY

Nov. 18, 1958
J. W. HARRISON
2,860,648
ANTI "G" LIQUID RESERVOIR
Filed Dec. 28, 1955
2 Sheets-Sheet 2
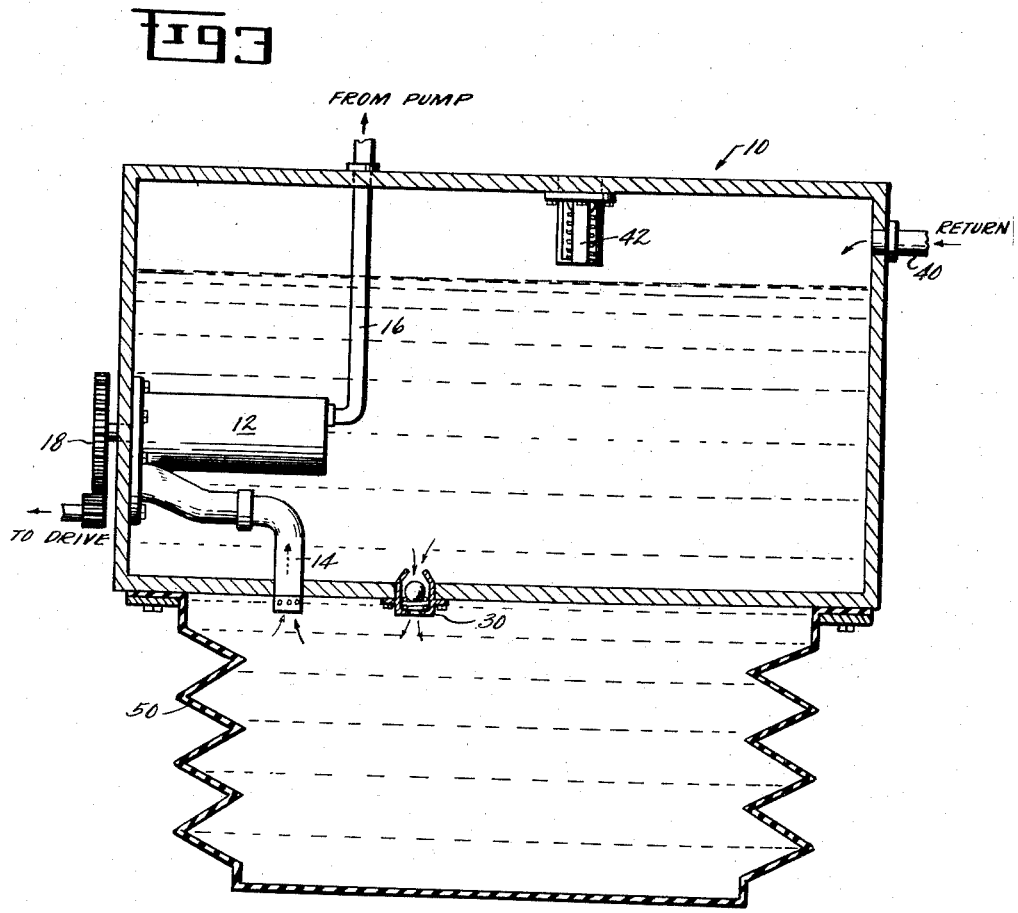
INVENTOR.
JOHN W. HARRISON
BY Harold H. Green Jr.
HIS ATTORNEY

2,860,648
ANTI "G" LIQUID RESERVOIR

John Ward Harrison, Danvers, Mass., assignor to General Electric Company, a corporation of New York Application December 28, 1955, Serial No. 555,830

7 Claims. (Cl. 137—38)

This invention relates to liquid supply systems, and more particularly to an improved anti "G" reservoir suitable for aircraft use.

In present day aircraft there are at least three types of liquid supply systems in common use on aircraft. These are the fuel supply system, an engine lubrication system and an aircraft hydraulic system. In each of these systems, it is common practice to pump a liquid from a reservoir in which a pump inlet is normally submerged under the surface of the liquid contained therein. In aircraft applications, it often happens that during maneuvering of the aircraft a force of acceleration acts for a limited period of time on the aircraft in a direction opposite to the normal force of gravity. This is commonly referred to as a negative "G" condition. Under negative "G" conditions any liquids contained in a reservoir which is not completely full will move to the top of the reservoir thus tending to uncover a pump inlet which is located at the bottom of the reservoir to be normally covered. This, of course, is undesirable in that it causes a discontinuance of the supply of liquid during this period and also causes the pump to become unloaded which may result in overspeed difficulties in connection with the pump drive. In the case of a fuel tank in which liquid is removed from a tank or reservoir and not returned thereto the problem is easily solved merely by providing an expansive or variable volume container. But in many applications such as in lubrication systems liquid is returned to the reservoir mixed with air rendering this solution impractical.

Accordingly, it is an object of the present invention to provide an improved liquid reservoir which operates to maintain a supply of liquid at a pump inlet under negative "G" conditions. Briefly stated, this and other objects of the invention are accomplished by providing an anti-"G" tank of variable volume mounted near the bottom of the reservoir which is kept filled with liquid from the main reservoir. The invention will be better understood from the following description taken in connection with the accompanying drawing in which:

Figure 3 is a cross-sectional view of a second embodiment of the invention.

Figure 1:
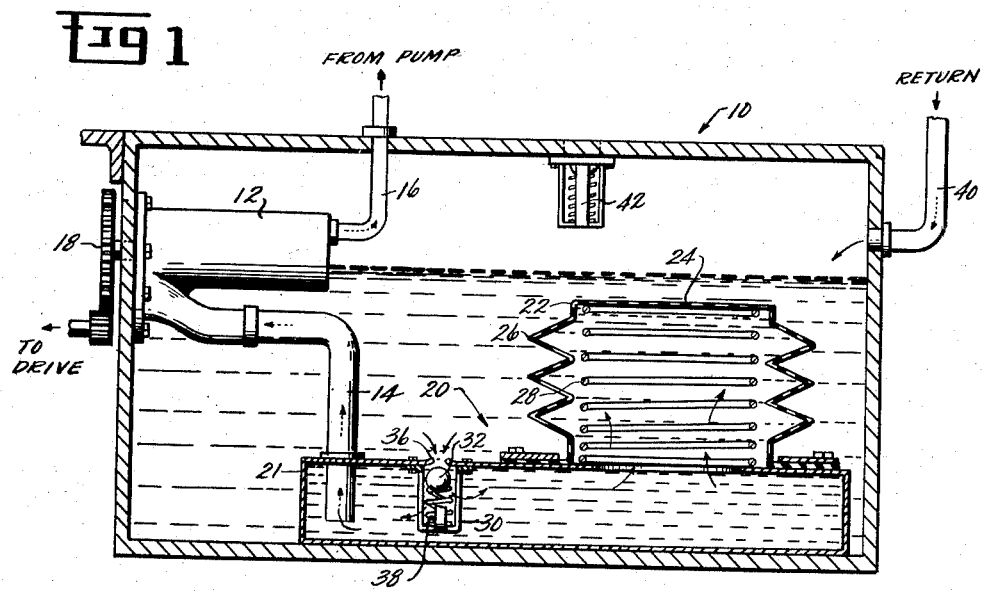
Figure 1 is a cross-sectional view of a liquid reservoir provided with an anti-"G" tank in accordance with the present invention.

In the drawing a reservoir is indicated generally at 10. Mounted on one wall of the reservoir 10 is a liquid pump 12 of any common design which has an inlet conduit 14, a discharge conduit 16 and is shown in the drawing as being driven from a drive unit (not shown) through a gear train 18 having a shaft extending through a wall of the reservoir 10. It is not essential that the pump 12 be physically located within the reservoir and may be mounted externally with the inlet conduit 14 extending through a wall into the reservoir 10. Mounted within the reservoir 10 near the bottom thereof is an anti-"G" tank generally indicated at 20 comprising a rigid wall portion 21 and a bellows portion 22 having a relatively stiff top portion 24 and flexible side walls 26. The side walls may be made from any suitable flexible material, resistant to the liquid contained in the reservoir such as neoprene, and may have permanent creases therein to allow the bellows to collapse as the liquid is moved therefrom. The bellows portion 22 and the portion of the anti-"G" tank 20 formed by the walls 21 cooperate to form a fluid tight enclosure of variable volume within the reservoir. The bellows 22 is spring loaded by means of a helical compression spring 28 between the top surface 24 of the bellows 22 and the wall 21 to prevent collapse of bellows under normal operating conditions.

Figure 2:
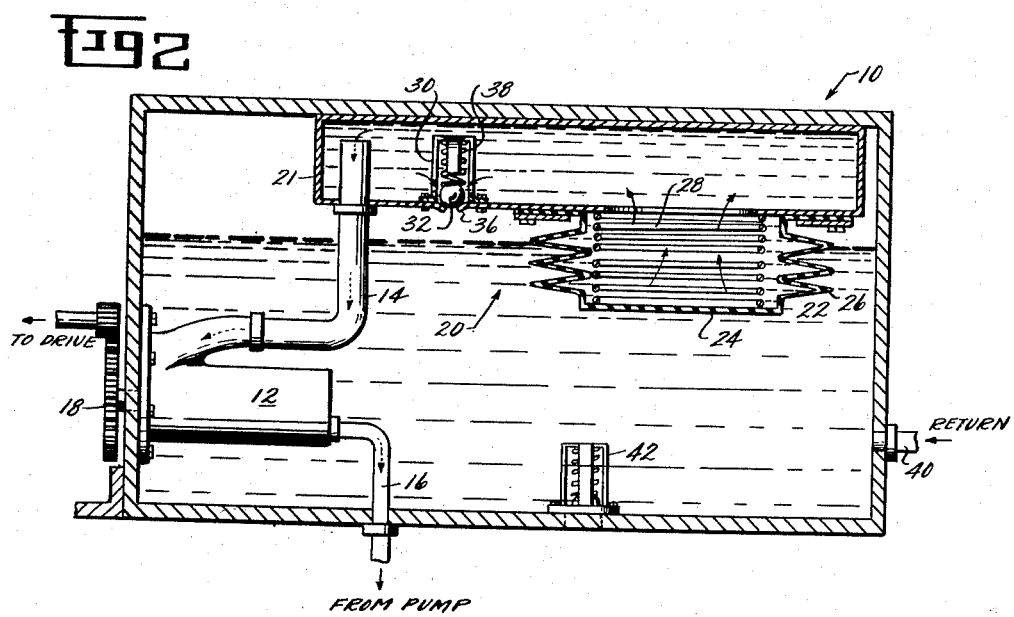
Figure 2 shows the same apparatus in the inverted position.

Fluid communication is provided between the interior of the reservoir 10 and that of the anti-"G" tank 20 through a conventional gravity check valve 30 shown in the drawing as comprising a ball 32 which is normally held against an opening 36 by means of a spring 38. Normally the force of gravity acting on the ball 32 is sufficient to depress the spring 38 holding the valve open, but the spring is so selected that when an acceleration force lessens the force of gravity on the ball 32, the valve closes as indicated in Figure 2. The use of the spring 32 permits the valve to close even before a negative "G" condition occurs thus preventing air from entering the negative "G" tank under zero "G" conditions.

Fluid communication is provided between the interior of the anti-"G" tank 20 and the pump 12 by means of the pump conduit inlet 14 which has an open end extending into the interior of the anti-"G" tank 20. The discharge conduit 16 of the pump extends through a wall of the reservoir 10 to deliver liquid to any desired location on board the aircraft. Liquid returning from remote locations in the aircraft re-enters reservoir through a liquid return line 40. In certain applications such as where the liquid is lubricating oil where liquid is scavenged by a pump from a sump beneath the lubricated parts, the return flow of liquid through the return line 40 is apt to contain a great deal of air. To prevent excessive pressures building up within the reservoir 10, as a result of air being pumped into the reservoir, one or more gravity check valves 42, similar in design to the gravity check valve 30, may be supplied to vent the return of the reservoir 10 to atmosphere. Normally only one such valve will be required at the top of the reservoir inasmuch as the pressure build-up will not be great during limited periods during which negative "G" conditions exist.

It will be noted in Figure 1 liquid level within the reservoir 10 is somewhat below the top of the tank. The level of liquid in the tank under normal operating conditions is subject to considerable variation at various times as a result of thermal expansion of the liquid at varying temperatures and also various fluid system load and leakage factors.

The operation of the apparatus thus described is as follows. Under normal operating conditions, that is in the absence of a negative "G" condition, the parts will be positioned as shown in Figure 1. Liquid is picked up by the pump 12 from the anti-"G" tank 20 through the inlet duct 14 and delivered by the pump under pressure through the pump discharge conduit 16 to the remainder of the system. Liquid returns to the reservoir 10 from the system through the return conduit 40. The return flow may contain a great deal of air mixed with the liquid which is allowed to escape through the gravity check valve 42. If the return flow contains a great deal of air-liquid foam, it may be desirable to provide a series of baffles (not shown) within the reservoir to allow thorough separation of air and oil as the oil settles to the bottom of the reservoir. Under normal conditions, the valve 30 is in the open position as indicated in Figure 1 so that liquid flows therethrough into the anti-"G" tank 20 to replace that removed by the pump.

Should the reservoir 10 experience a negative "G" condition such as would accompany inverting the entire reservoir 10 as shown in Figure 2, the operation of the apparatus is as follows. The combined forces of gravity and the spring 38 acting upon the ball 32 forces it against the orifice 36 to close the valve 30. Thus air is prevented from entering the anti-"G" tank 20 from the reservoir 10. As the pump continues to remove liquid from the anti-"G" tank 20 through the pump inlet conduit 14, the resulting pressure differential between the interior and exterior of the bellows 22 causes it to collapse. It should be noted that the capacity of the bellows assembly 22 is such that it will hold sufficient liquid to supply the pump during the entire period of negative-"G" operation and the bellows will collapse completely before pump suction causes the valve 32 to reopen. Upon resuming normal operating conditions, the valve 30 reopens so that liquid from the reservoir pump flows by gravity into the anti-"G" tank refilling the bellows 22.

In the second embodiment, as shown in Figure 3 a bellows 50 externally mounted on the wall of the reservoir is used in place of the anti-"G" tanks 20 and associated parts in Figures 1 and 2. Using like characters for like parts, the gravity check valve 30 is located in the bottom wall of the reservoir 10 and controls fluid communication between the interior of the reservoir 10 and the bellows 50. In this arrangement, it is not necessary to have a spring to prevent it from collapsing under normal operating conditions since the weight of the fluid contained therein will perform this function. The full capacity of the reservoir 10 and bellows 50 is not available under normal flight conditions, however, since the pump inlet conduit 14 cannot extend below the position of the tank 10. The operation of this embodiment is essentially the same as that shown in Figures 1 and 2.

Thus it will be seen that a reservoir is provided whereby a liquid pump is provided with a continuous supply of liquid during limited periods of time during which negative "G" conditions exist.

While two particular embodiments of the invention have been shown and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. In a liquid supply system, first and second liquid containers, at least a portion of the total volume defining structure of said first container comprising a member deflectable to vary the total volume of said first container responsive to a pressure differential between the interior and the exterior thereof, means for supplying liquid to said second container, means to withdraw liquid from said first container and means to provide fluid communication between said first and second liquid containers when the net force acting on said system is in the direction of the normal gravitational force and the system is in its normal operating position and to interrupt said fluid communication on inversion of the system or in response to a net acceleration force opposite in direction to the normal force of gravity.

2. Apparatus in accordance with claim 1 wherein the portion of said first liquid container is lower with respect to the normal direction of gravitational force than the major portion of said second liquid container when the system is in its normal operation position.

3. In a liquid supply system, a liquid container having mounted therein an enclosure having an elastic and resilient wall portion responsive to fluid pressure differentials between the interior and the exterior of said enclosure to vary the total volume thereof, and valve means to provide fluid communication between said container and said enclosure when the net force acting on said system is in the direction of the normal gravitational force thereon and the system is in its normal operating position, and to interrupt fluid communication therebetween, on inversion of the system or in response to a net acceleration force opposite in direction to the normal force of gravity.

4. A liquid reservoir having mounted near the bottom thereof with respect to the normal direction of gravitational force thereon a fluid tight enclosure comprising an elastic wall portion responsive to fluid pressure differentials between the interior and exterior of said enclosure to vary the total volume thereof, an opening between the interior of said enclosure and said reservoir, means for closing said opening in response to a net acceleration force opposite in direction to the normal force of gravity, and a fluid conduit providing fluid communication with the interior of said enclosure and adapted to supply liquid therefrom to a pump inlet.

5. In a liquid supply system, a liquid pump, a liquid reservoir, a fluid tight enclosure mounted near the bottom of said reservoir with respect to the normal direction of gravitational force on the system, said enclosure comprising expansible bellows means, an opening providing fluid communication between the interior of said enclosure and the interior of said reservoir when the net force acting on said system is in the direction of the normal gravitational force thereon and the system is in its normal operating position, a valve means located in said opening to obstruct said fluid communication on inversion of the system or in response to a net acceleration force opposite in direction to the normal force of gravity, and conduit means for conveying liquid from said enclosure to an inlet for said pump.

6. In a liquid supply system including a liquid pump, a liquid reservoir having mounted near the bottom thereof with respect to the normal direction of gravitational force on the system a container of changeable volume including a rigid wall portion and a flexible wall portion, means for biasing said flexible wall portion to increase the internal volume of said container, valve means in said rigid wall portion to provide fluid communication between said liquid reservoir and said container when the net force acting on said system is in the direction of the normal gravitational force thereon and the system is in its normal operation position and to interrupt said fluid communication on inversion of the system or in response to a net acceleration force opposite in direction to the normal force of gravity, means for conducting liquid from the interior of said container to the inlet to said pump and means to supply liquid to said reservoir through an opening in the walls thereof.

7. In a liquid supply system including a liquid pump, the combination of a liquid reservoir for said pump, a variable volume enclosure mounted within said reservoir near the bottom thereof with respect to the normal direction of gravitational force on said system, means biasing at least a portion of the walls of said variable volume enclosure to enlarge volume enclosed thereto, means between said variable volume enclosure and said reservoir for providing fluid communication therebetween when the net force acting on said system is in the direction of the normal gravitational force thereon and the system is in its normal operating position and interrupting said communication on inversion of the system or in response to a net acceleration force in a direction opposite to the normal force of gravity, conduit means providing fluid communication with the interior of said variable volume enclosure and adapted to be connected to the inlet of a liquid pump, and an opening through a wall of said reservoir for return of liquid thereto.

References Cited in the file of this patent

UNITED STATES PATENTS 1,260,739     Yeamans _____ Mar. 26, 1918